United States Patent Office 3,637,708
Patented Jan. 25, 1972

3,637,708
WATER-INSOLUBLE PERINONE DYESTUFFS
Richard Peter and Enrico Gallacchi, Basel, Switzerland, assignors to Ciba Limited, Basel, Switzerland
No Drawing. Filed Nov. 20, 1967, Ser. No. 684,522
Claims priority, application Switzerland, Nov. 21, 1966, 16,658/66; Oct. 16, 1967, 14,444/67
Int. Cl. C07d 57/02
U.S. Cl. 260—282
6 Claims

ABSTRACT OF THE DISCLOSURE

Water-insoluble perinones carrying at one of the peri-positions of the naphthalene nucleus a heterocyclic substituent bound via a sulfur, nitrogen or oxygen atom.

---

The present invention provides perinone dyestuffs of the general formula

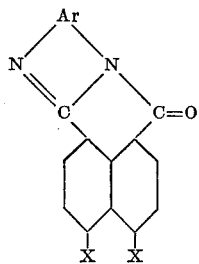

in which Ar represents an unsubstituted or substituted aromatic residue, one X represents a hydrogen atom and the other a group of the formula

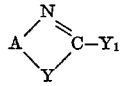

where A represents an unsubstituted or substituted aryl radical, Y and $Y_1$ each represents an oxygen or sulphur atom or an imino group. The invention also provides a process for the manufacture of perinone dyestuffs of the above general formula, wherein (a) a perinone of the formula

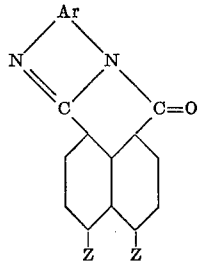

where one Z stands for a halogen atom or a sulphonic acid group and the other for a hydrogen atom, is condensed with an azole of the formula

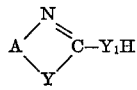

(b) a naphthalic acid of the formula

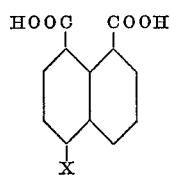

where X is a group of the formula

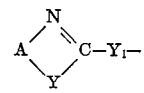

or an anhydride thereof is condensed with an aromatic diamine whose amino groups are in ortho- or peri-position to each other.

In the halogenoperinones or sulphoperinones to be used as starting materials Ar represents, for example, a naphthylene or preferably a phenylene residue which may be substituted for instance by alkyl, phenyl or alkoxy groups. Thus, those perinones are of special value which correspond to the formula

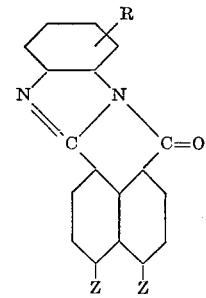

in which R represents a hydrogen or halogen atom, an alkyl, phenyl, alkoxy N-alkylamino or N,N-dialkylamino group and Z has the meaning defined above.

These starting materials may be obtained by condensing 4-chloronaphthalic, 4-bromonaphthalic or 4-sulphonaphthalic acid or the anhydride thereof with an aromatic diamine whose amino groups are in ortho- or peri-position relatively to each other, inter alia, for example, with ortho-phenylenediamine,
1,2-diamino-4-methylbenzene,
1,2-diamino-2-methylbenzene,
1,2-diamino-4-methoxybenzene,
1,2-diamino-2-methoxybenzene,
1,2-diamino-4-ethoxybenzene,
1,2-diamino-2-ethoxybenzene,
1,2-diamino-4-nitrobenzene,
1,2-diaminonaphthalene,
2,3-diaminonaphthalene,
1,8-diaminonaphthalene,
3,4-diaminodiphenyl,
1,2-diamino-4-chloro- or bromobenzene,
1,2-diamino-4-N-alkylaminobenzene or
1,2-diamino-4-N,N-dialkylaminobenzene.

When unsubstituted o-phenylenediamines are used as starting materials, there is obtained a mixture of the two isomeric compounds of the formulae

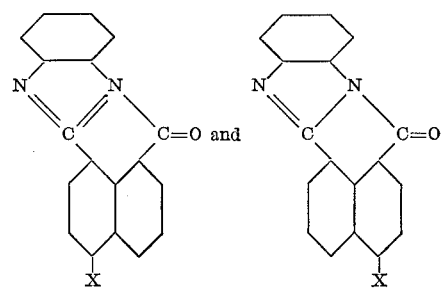

while nuclear substituted o-phenylenediamines, on reaction with 4-chloronaphthalic, 4-bromonaphthalic or 4- sulphonaphthalic acid, give rise to mixtures consisting of 4-isomeric perinones.

The above-mentioned perinones are condensed with azoles, for example with a 2-hydroxybenzthiazole or 2-aminobenzthiazole or preferably with a 2-mercaptobenzthiazole, especially one of the formula

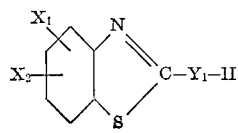

in which $X_1$ and $X_2$ each represents a hydrogen or halogen atom, an alkyl, alkoxy, cyano or alkylsulphonyl group, and $Y_1$ represents an oxygen or a sulphur atom or an imino group. In addition, there may also be mentioned 2-mercapto-, 2-hydroxy- and 2-amino-benzoxazoles and -benzimidazoles.

As examples of azoles the following may be mentioned: 2-mercapto-benzthiazole, 2-mercapto-6-methylbenzthiazole, 2-mercapto-6-methoxybenzthiazole, 2-mercapto-5-chlorobenzthiazole, 2-mercapto-6-chlorobenzthiazole, 2-mercapto-6-cyanobenzthiazole, 2-mercapto-6-methylsulphonylbenzthiazole, 2-mercapto-benzimidazole, 2-aminobenzimidazole, 2-aminobenzthiazole, 2-hydroxybenzimidazole, 2-hydroxybenzoxazole and 2-mercaptobenzoxazole.

The reaction of the halogenoperinone or sulphoperinone with the azole is advantageously carried out in the presence of an alkali metal carbonate or hydroxide, at an elevated temperature, preferably in an organic solvent, for example in an alcohol, or in dimethylformamide. It is advantageous to use at least 1 mol of the alkali metal compound for every 1 mol of the perinone.

The reaction according to variant (b) of the process of this invention is advantageously carried out at an elevated temperature, especially between 80 and 200° C., preferably in an organic solvent such, for example, as pyridine, glacial acetic acid, chlorobenzene or o-dichlorobenzene or in water under superatmospheric pressure.

The new dyestuffs lend themselves excellently to dyeing or printing materials, especially fibres or fabrics, for example of cellulose triacetate or polyamides, and especially of aromatic polyesters. On these materials dyeings of very good fastness properties, especially fastness to light, sublimation and abrasion, are obtained. These dyeings are also suitable for use in further improving the textiles by the permanent press method, for example the Koratron process. Dyeings of the new dyestuffs provided with such finishes display very good wet and heat fastness.

For dyeing the new dyestuffs are advantageously used in a finely disperse form, in admixture with dispersants such as soap, sulphite cellulose waste liquor or synthetic detergents or a combination of different wetting and dispersing agents. In general, it is advantageous to convert the dyestuffs into a dye preparation before dyeing; this dye preparation contains a dispersant and finely disperse dyestuff in such a form that when the dye preparation is diluted with water a fine dispersion is formed. Such dye preparation may be manufactured in known manner, for example, by reprecipitating the dyestuff from sulphuric acid and grinding the resulting suspension with dinaphthylmethane-disulphonic acid, or by grinding the dyestuff in a highly efficient grinding device in the dry or wet form, with or without addition of a dispersant during the grinding operation.

To obtain strong dyeings on polyethyleneterephthalate fibres it is advantageous to add a swelling agent to the dyebath, or especially to carry out the dyeing process under pressure at a temperature above 100° C., for example at 120° C. Suitable swelling agents are aromatic carboxylic acids, for example benzoic or salicylic acid, phenols such, for example, as o- or p-hydroxydiphenyl, aromatic halogen compounds, for example, chlorobenzene, o-dichlorobenzene or trichlorobenzene, phenylmethylcarbinol or diphenyl. When dyeing under superatmospheric pressure it is advantageous to render the dyebath weakly acidic, for example, by addition of a weak acid, for instance acetic acid.

The new dyestuffs are stable towards alkalies and are therefore also suitable for dyeing by the so-called thermofixation process according to which the fabric to be dyed is impregnated with an aqueous dispersion of the dyestuff, which advantageously contains 1 to 50% of urea and a thickener, especially sodium alginate, preferably at a temperature not exceeding 60° C., and then squeezed in the usual manner, advantageously so that the original weight of the fabric is increased by 50 to 100% by the liquid retained by it.

To fix the dyestuffs on it the impregnated fabric is then heated to a temperature above 100° C., for example within the range from 180 to 220° C., advantageously after having first been dried, for example in a current of warm air.

The thermofixation process just mentioned is of special importance to dyeing mixed weaves of polyester fibres and cellulose fibres, especially cotton. In this case the padding liquor contains in addition to the dyestuffs of this invention dyestuffs suitable for dyeing cotton, especially vat dyes, or reactive dyestuffs, that is to say dyestuffs that can be fixed on the cellulose fibre by formation of a chemical bond, that is to say for instance dyestuffs that contain a chlorotriazine or chlorodiazine ring. In the latter case it is found advantageous to add to the padding liquor an acid acceptor, for example an alkali metal carbonate, phosphate, borate or perborate or a mixture of these substances. When vat dyes are used, the padded fabric requires after the heat treatment a further treatment with an aqueous alkaline solution of one of the reducing agents commonly used in vat dyeing.

By virtue of their good reserving power for wool the dyestuffs of this invention lend themselves also excellently to dyeing mixed weaves of polyester fibres and wool.

The resulting dyeings are advantageously subjected to an after treatment, for example by being heated with an aqueous solution of a nonionic detergent.

The new dyestuffs are not only suitable for impregnating but also for printing; for this purpose a printing paste is used, for example, which contains apart from the assistants conventionally used in printing, such as wetting and thickening agents, the finely disperse dyestuff, if desired in admixture with one of the afore-mentioned cotton dyestuffs, if required or desired in the presence of urea and/or an acid acceptor. The dyestuffs of this invention may also be used for dyeing in the mass.

The following examples illustrate the invention. Unless otherwise indicated, the parts and percentages are by weight.

EXAMPLE 1

2.07 parts of the perinone obtained by condensing 4-bromonaphthalic acid anhydride with o-phenylenediamine, in 20 grams of dimethylformamide are heated for 30 minutes at the boil with 1 part of mercaptobenzthiazole and 1.85 parts of sodium carbonate. On crystallization after cooling, the dyestuff forms brownish yellow crystals. It colours polyester materials brilliant greenish yellow shades of excellent fastness to light and sublimation.

The following table lists further dyestuffs which are obtained when the perinones from 4-bromonaphthalic anhydride and the o-phenylenediamines shown in column I are heated with the azoles of column II as described in this example. Column III shows the shades obtained with these dyestuffs on polyester fibres.

this temperature for 1 hour in a closed vat, and then thoroughly rinsed. The resulting brilliant greenish yellow dyeing displays excellent fastness to light and sublimation.

| | I | II | III |
|---|---|---|---|
| 1 | 1,2-diamino-4-methoxy-benzene | 2-mercapto-5-methoxy-benzimidazole | Reddish yellow. |
| 2 | do | 2-mercapto-5-nitro-benzimidazole | Do. |
| 3 | do | 2-mercapto-5-methyl-benzimidazole | Do. |
| 4 | 1,2-diamino-4-nitro-benzene | 2-mercapto-5-methoxy-benzimidazole | Orange. |
| 5 | 1,2-diamino-4-chlor-benzene | 2-mercapto-5-chlor-benzimidazole | Yellow. |
| 6 | do | 2-mercapto-5-nitro-benzimidazole | Greenish yellow. |
| 7 | 1,2-diamino-4-methoxy-benzene | 2-mercapto-5-chlor-benzimidazole | Orange. |
| 8 | 1,2-diamino-4-nitro-benzene | 2-mercapto-benzimidazole | Brown-yellow. |
| 9 | 1,2-diamino-4-chlor-benzene | do | Yellow. |
| 10 | 1,2-diamino-4-methyl-benzene | do | Do. |
| 11 | 1,2-diamino-4,5-dimethoxy-benzene | do | Red-orange. |
| 12 | do | 2-mercapto-5-methoxy-benzimidazole | Do. |
| 13 | 1,2-diamino-4-methoxy-benzene | 2-mercapto-benzimidazole | Yellow. |
| 14 | 1,2-diamino-benzene | do | Greenish yellow. |
| 15 | do | 2-mercapto-benzthiazole | Do. |
| 16 | 1,2-diamino-4-methoxy-benzene | do | Yellow. |
| 17 | 1,2-diamino-4-nitro-benzene | do | Greenish yellow. |
| 18 | 1,2-diamino-4-chlor-benzene | do | Do. |
| 19 | 1,2-diamino-4-methyl-benzene | do | Brown-yellow. |
| 20 | 1,2-diamino-4,5-dimethoxy-benzene | do | Red-orange. |
| 21 | 1,2-diamino-4-methoxy-benzene | 2-mercapto-benzoxazole | Yellow. |
| 22 | 1,2-diamino-4-nitro-benzene | do | Greenish yellow. |
| 23 | 1,2-diamino-4-chlor-benzene | do | Do. |
| 24 | 1,2-diamino-4-methyl-benzene | do | Yellow. |
| 25 | 1,2-diamino-4-methoxy-benzene | 2-mercapto-5-chlor-benzoxazole | Do. |
| 26 | do | 2-mercapto-5-chlor-6-nitro-benzole | Brown-yellow. |
| 27 | 1,2-diamino-4-nitro-benzene | 2-amino-benzthiazole | Orange. |
| 28 | 1,2-diamino-4-methoxy-benzene | do | Reddish yellow. |
| 29 | 1,2-diamino-4-chlor-benzene | 2-amino-5-chlor-benzoxazole | Greenish yellow. |
| 30 | 1,2-diamino-4-methoxy-benzene | do | Reddish yellow. |
| 31 | do | 2-hydroxy-benzimidazole | Yellow. |
| 32 | 1,2-diamino-4,5-dimethyl-benzene | 2-mercapto-benzimidazole | Greenish yellow. |
| 33 | do | 2-mercapto-benzoxazole | Yellow. |
| 34 | do | 2-mercapto-benzthiazole | Greenish yellow. |
| 35 | do | 2-mercapto-5,6-dimethyl-benzimidazole | Yellow. |
| 36 | 1,2-diamino-4-methoxy-benzene | do | Reddish yellow. |
| 37 | 1,2-diamino-4,5-dimethyl-benzene | 2-amino-benzthiazole | Yellow. |
| 38 | do | 2-amino-benzimidazole | Do. |
| 39 | do | 2-amino-6-methyl-benzthiazole | Reddish yellow. |
| 40 | 1,2-diamino-4-methoxy-benzene | 2-amino-benzimidazole | Yellow. |
| 41 | do | 2-amino-6-methyl-benzthiazole | Do. |
| 42 | do | do | Do. |
| 43 | 1,2-diamino-4,5-dimethyl-benzene | 2-hydroxy-benzoxazole | Do. |
| 44 | 1,2-diamino-4-methoxy-benzene | do | Do. |
| 45 | 1,2-diamino-4,5-dimethoxy-benzene | 2-mercapto-5-nitro-benzimidazole | Orange. |
| 46 | do | 2-mercapto-5-nitro-6-chlor-benzoxazole | Yellow-brown. |
| 47 | 1,2-diamino-4-methoxy-benzene | 2-mercapto-5,6-dimethoxy-benzimidazole | Yellowish orange. |
| 48 | 1,2-diamino-4,5-dimethoxy-benzene | do | Reddish orange. |

EXAMPLE 2

5.54 parts of 4-bromonaphthalic anhydride in 80 parts by volume of dimethylformamide are heated with 3.3 parts of 2-aminobenzthiazole and 8 parts of sodium carbonate for 1 hour at 160 to 170° C. 4.3 parts of the green crystals obtained after cooling are dissolved in 120 parts by volume of glacial acetic acid and under reflux mixed with a solution of 3 parts of 3,4-diaminoanisole in 60 parts by volume of glacial acetic acid. After 4 hours the whole is allowed to cool, whereupon greenish yellow needles crystallize out which produce on polyesters brilliant greenish yellow shades with excellent fastness to light and sublimation.

Dyeing instruction

A wet mixture of 1 part of the dyestuff obtained as described in the first paragraph of Example 1 and 2 parts of a 50% aqueous solution of the sodium salt of dinaphthylmethanedisulphonic acid is ground and then dried.

This dyestuff preparation is stirred with 40 parts of a 10% aqueous solution of a condensation product of octadecyl alcohol with 20 mols of ethylene oxide, and 4 parts of 40% acetic acid solution are added. By dilution with water this mixture is turned into a dyebath of 4000 parts.

100 parts of a cleaned polyester fibre material are immersed in this bath at 50°C., the temperature is raised within ½ hour to 120–130°C. and the material is dyed at

We claim:
1. A perinone dyestuff of the formula

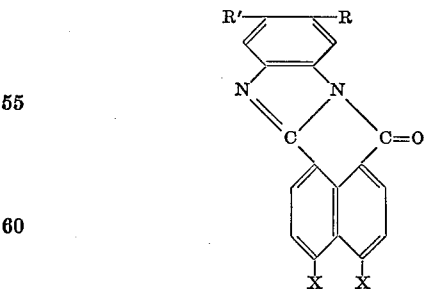

which is free from water-solubilizing groups and in which R is hydrogen, alkoxy having up to 2 carbon atoms, halogen, alkyl having up to 2 carbon atoms, phenyl, N-alkylamino having up to 2 carbon atoms, nitro and N,N-di-alkylamino having up to 4 carbon atoms, R' is hydrogen, alkoxy having up to 2 carbon atoms and alkyl having up to 2 carbon atoms, one X is hydrogen and one X is a group of the formula

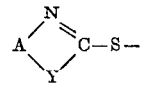

wherein A is a 1,2-arylene of the formula

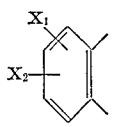

where $X_1$ and $X_2$ each is a hydrogen, cyano, methylsulfonyl, nitro, halogen, alkyl or alkoxy group each having up to two carbon atoms and when $X_1$ is cyano or nitro, $X_2$ is hydprogen and Y is oxygen, sulfur or —NH—.

2. A perinone dyestuff as claimed in claim 1 in which one X is of the formula

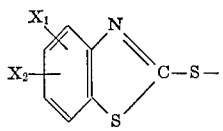

where $X_1$ and $X_2$ each is a hydrogen, cyano, methylsulfonyl, nitro, halogen, alkyl or alkoxy group each having up to two carbon atoms and when $X_1$ is cyano or nitro, $X_2$ is hydrogen.

3. A dyestuff according to claim 1 of the formula

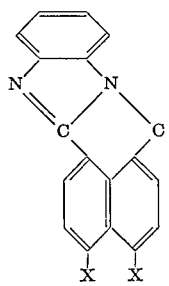

wherein one X is hydrogen and the other a group of the formula

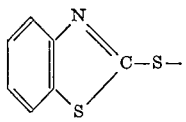

4. A dyestuff according to claim 1 of the formula

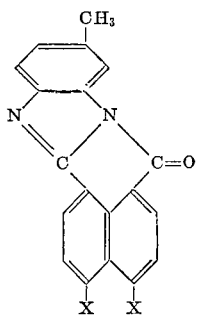

wherein one X is hydrogen and the other a group of the formula

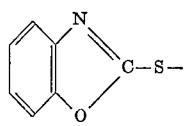

5. A dyestuff according to claim 1 of the formula

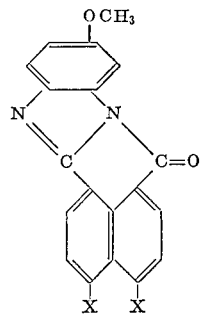

wherein one X is hydrogen and the other a group of the formula

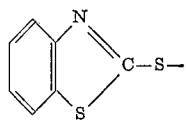

6. A dyestuff according to claim 1 of the formula

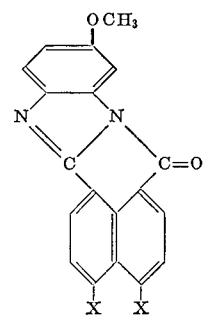

wherein one X is hydrogen and the other a group of the formula

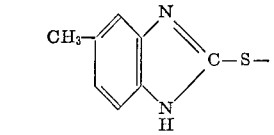

References Cited
UNITED STATES PATENTS

| | | | |
|---|---|---|---|
| 3,306,904 | 2/1967 | Sieber | 260—282 X |
| 3,444,172 | 5/1969 | Senshu | 260—282 |
| 3,308,127 | 3/1967 | Senshu | 260—281 |
| 3,322,769 | 5/1967 | Fuchs | 260—282 |

FOREIGN PATENTS

| | | | |
|---|---|---|---|
| 179,324 | 5/1966 | Russia | 260—282 |

DONALD G. DAUS, Primary Examiner

U.S. Cl. X.R.

8—55; 260—248 R, 304, 305, 306, 307 D, 309.2